United States Patent [19]

Osler et al.

[11] Patent Number: 6,038,222
[45] Date of Patent: Mar. 14, 2000

[54] MODEM COMMAND AND DATA INTERFACE

[75] Inventors: Bruce P. Osler, Hudson; Leo A. Goyette, Pelham, both of N.H.

[73] Assignee: Telebit Corporation, San Jose, Calif.

[21] Appl. No.: 08/893,193

[22] Filed: Jul. 15, 1997

Related U.S. Application Data

[60] Provisional application No. 60/022,812, Jul. 25, 1996.

[51] Int. Cl.[7] .................................................. H04B 3/00
[52] U.S. Cl. .......................................... 370/282; 375/222
[58] Field of Search ............................... 370/282; 375/222

[56] References Cited

U.S. PATENT DOCUMENTS

| Re. 33,900 | 4/1992 | Howson | 370/105 |
|---|---|---|---|
| 4,438,511 | 3/1984 | Baran | 370/19 |
| 4,445,213 | 4/1984 | Baugh et al. | 370/94 |
| 4,578,796 | 3/1986 | Charalambous et al. | 375/8 |
| 4,620,294 | 10/1986 | Leung et al. | 364/900 |
| 4,679,227 | 7/1987 | Hughes-Hartogs | 379/98 |
| 4,757,495 | 7/1988 | Decker et al. | 370/76 |
| 4,884,285 | 11/1989 | Heynen et al. | 375/25 |
| 4,922,534 | 5/1990 | Gorniak et al. | 380/49 |
| 4,991,169 | 2/1991 | Davis et al. | 370/77 |
| 5,276,739 | 1/1994 | Krokstad et al. | 381/68.2 |
| 5,353,338 | 10/1994 | Nakano et al. | 379/99 |
| 5,497,373 | 3/1996 | Hulen et al. | 370/79 |
| 5,553,063 | 9/1996 | Dickson | 370/29 |
| 5,949,762 | 9/1999 | Green et al. | 370/259 |

OTHER PUBLICATIONS

Taylor, Kieran; "Analog and ISDN Access Is in the Cards"; Nov., 1995.

Silberschatz, Abraham, and Galvin, Peter B., "Operating System Concepts," Addison–Wesley Publishing Company, Fourth Edition, pp. 99–102, undated.

Beyer, D.A. et al., "A Packet Radio API", IEEE, pp. 1261–1265, Jun. 1997.

Primary Examiner—Melvin Marcelo
Attorney, Agent, or Firm—Cesari and McKenna, LLP

[57] ABSTRACT

An interface between a computer and a telephone line includes an interface device controlled by a set of commands. The commands are divided into a plurality of categories, each of which corresponds to a class of operations performed by the interface device, with each command being included within a single category. The interface device reads a command selected from a category of commands and performs an operation from the class operations that corresponds the selected category of commands.

30 Claims, 5 Drawing Sheets

| 54A 56A | HEX ID 1 WORD-16 /52A | F/U 7 WORD-16 /58A | /60A | |
|---|---|---|---|---|---|
| HEAD 1 WORD-16 | TAIL 1 WORD-16 | TRANSMIT QUEUE CHANNEL A0 1 KByte | TX MAIL A0 64 WORD-16 | UNUSED PAD TO 2 KByte | 50A |
| HEAD 1 WORD-16 | TAIL 1 WORD-16 | TRANSMIT QUEUE CHANNEL A1 1 KByte | TX MAIL A1 64 WORD-16 | UNUSED PAD TO 2 KByte | 50B |
| 54B | 56B | 52B | 58B | 60B | |
| 54C | 56C | 52C | 58C | 60C | |
| HEAD 1 WORD-16 | TAIL 1 WORD-16 | TRANSMIT QUEUE CHANNEL A2 1 KByte | TX MAIL A2 64 WORD-16 | UNUSED PAD TO 2 KByte | 50C |
| HEAD 1 WORD-16 | TAIL 1 WORD-16 | TRANSMIT QUEUE CHANNEL A3 1 KByte | TX MAIL A3 64 WORD-16 | UNUSED PAD TO 2 KByte | 50D |
| 54D | 56D | 52D | 58D | 60D | |
| 54E | 56E | 52E | 58E | 60E | |
| HEAD 1 WORD-16 | TAIL 1 WORD-16 | TRANSMIT QUEUE CHANNEL A4 1 KByte | TX MAIL A4 64 WORD-16 | UNUSED PAD TO 2 KByte | 50E |
| HEAD 1 WORD-16 | TAIL 1 WORD-16 | TRANSMIT QUEUE CHANNEL A5 1 KByte | TX MAIL A5 64 WORD-16 | UNUSED PAD TO 2 KByte | 50F |
| 54F | 56F | 52F | 58F | 60F | |
| 54G | 56G | 52G | 58G | 60G | |
| HEAD 1 WORD-16 | TAIL 1 WORD-16 | RECEIVE QUEUE CHANNEL A0 1 KByte | RX MAIL A0 64 WORD-16 | UNUSED PAD TO 2 KByte | 50G |
| HEAD 1 WORD-16 | TAIL 1 WORD-16 | RECEIVE QUEUE CHANNEL A1 1 KByte | TX MAIL A1 64 WORD-16 | UNUSED PAD TO 2 KByte | 50H |
| 54H | 56H | 52H | 58H | 60H | |
| 54I | 56I | 52I | 58I | 60I | |
| HEAD 1 WORD-16 | TAIL 1 WORD-16 | RECEIVE QUEUE CHANNEL A2 1 KByte | RX MAIL A2 64 WORD-16 | UNUSED PAD TO 2 KByte | 50I |
| HEAD 1 WORD-16 | TAIL 1 WORD-16 | RECEIVE QUEUE CHANNEL A3 1 KByte | RX MAIL A3 64 WORD-16 | UNUSED PAD TO 2 KByte | 50J |
| 54J | 56J | 52J | 58J | 60J | |
| 54K | 56K | 52K | 58K | 60K | |
| HEAD 1 WORD-16 | TAIL 1 WORD-16 | RECEIVE QUEUE CHANNEL A4 1 KByte | RX MAIL A4 64 WORD-16 | UNUSED PAD TO 2 KByte | 50K |
| HEAD 1 WORD-16 | TAIL 1 WORD-16 | RECEIVE QUEUE CHANNEL A5 1 KByte | RX MAIL A5 64 WORD-16 | UNUSED PAD TO 2 KByte | 50L |
| 54L | 56L | 52L | 58L | 60L | |

| COUNT | 1 | |
|---|---|---|
| STATUS | 78 ARGUMENT – MESSAGE #1 | 70 OPCODE – MESSAGE #1  76 |
| BODY | PARAMETER 0 – MESSAGE #1 | |
| BODY | PARAMETER 1 – MESSAGE #1 | |
| BODY | | 58 |
| BODY | PARAMETER (N) – MESSAGE #1 | |

FIG. 6

| COUNT | 2 | |
|---|---|---|
| STATUS | 78A ARGUMENT – MESSAGE #1 | 70 OPCODE – MESSAGE #1  76A | 74A
| BODY | PARAMETER 0 – MESSAGE #1 | |
| BODY | | 58 |
| BODY | PARAMETER N – MESSAGE #1 | |
| STATUS | 78B ARGUMENT – MESSAGE #2 | OPCODE – MESSAGE #2  76B | 74B
| BODY | PARAMETER 0 – MESSAGE #2 | |
| BODY | ... | |
| BODY | PARAMETER N – MESSAGE #2 | |

MODEM COMMAND AND DATA INTERFACE

RELATED APPLICATIONS

This application is based on U.S. provisional patent application Ser. No. 60/022,812, filed Jul. 25, 1996, the disclosure of which is incorporated herein in its entirety by reference.

BACKGROUND OF THE INVENTION

A common way for computers to communicate with each other over telephone lines is to employ modulator/demodulators ("modems"). For transmission, modems translate the computer's baseband digital signals to modulated-carrier signals that lend themselves to propagation over voice-grade telephone lines, and on reception they translate the carrier signals back again to the baseband signals that the computer recognizes.

Although analog circuitry has traditionally predominated in modems, attempts have been made more recently to take advantage of the superior reliability, repeatability, and flexibility that digital-signal-processing circuitry can provide. Advances in digital-signal-processor power have supported this trend, but the fact remains that performing modem functions digitally is decidedly computation intensive. As a consequence, modem designers have expended a great deal of effort to minimize the computational cost of digital modem operation. This effort has understandably tended to be concentrated on the modem's signal-processing aspects.

SUMMARY OF THE INVENTION

But we have recognized that a significant reduction in computational cost can also be achieved by simply re-coding the modem and computer interface. Conventionally, such an interface combines data exchange, command- and control-messaging exchange, and status-information exchange. The command and control information tells the modem what functions it should perform and what operational states it should adopt. The current-status information enables the computer and modem to share real-time information.

Whereas a modem command has traditionally been encoded in a character string, we instead encode each command as an integer. It turns out that this simple change can yield a substantial reduction in the modem's and computer's computation burdens, particularly when it is employed with a further feature that such encoding makes possible, namely, the grouping of codes numerically by category. The advantage lies in the fact that the decoding process in such an arrangement can be based on simple binary masking operations, instead of a string-compare function, which requires hundreds of times as many machine cycles as binary masking. In installations like that of a router, this impact is significant because there are potentially hundreds of modem commands to handle at any given instant.

Added to these savings are those that result from replacing conventional status-information messaging with notification messages that are similar in form to the command-code messages. The conventional method of passing status information between the modem and the computer requires using the EIA signal leads built into the modem's RS232 port. Detecting transitions and levels on these leads often requires computationally expensive polling tasks and/or interrupt-service handlers. The present invention eliminates the need for such monitoring: the modem sends all relevant status information to the computer in an appropriate status message when the status change occurs.

In addition to reducing computational complexity, the present invention makes it practical to simplify the command set. The number of strings whose meanings conventional modems must recognize as commands has grown quite large, numbering in the thousands, and some command strings represent relatively complicated combinations of functions. In contrast, the computational cost that the present invention's decoding process exacts is so small that a separate command can be decoded for each constituent function, so a command need be provided only for each such atomic function, not for a large number of combinations of them. As a consequence, each command can be encoded in a single byte.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 is a schematic diagram illustrating the structure of messages transferred across the command/data interface of the invention.

FIG. 5 is a schematic illustration of an example of a mailbox message in accordance with the present invention.

FIG. 6 is a schematic diagram of a second example of a mailbox message in accordance with the present invention.

DETAILED DESCRIPTION OF THE INVENTION

Figure 1:
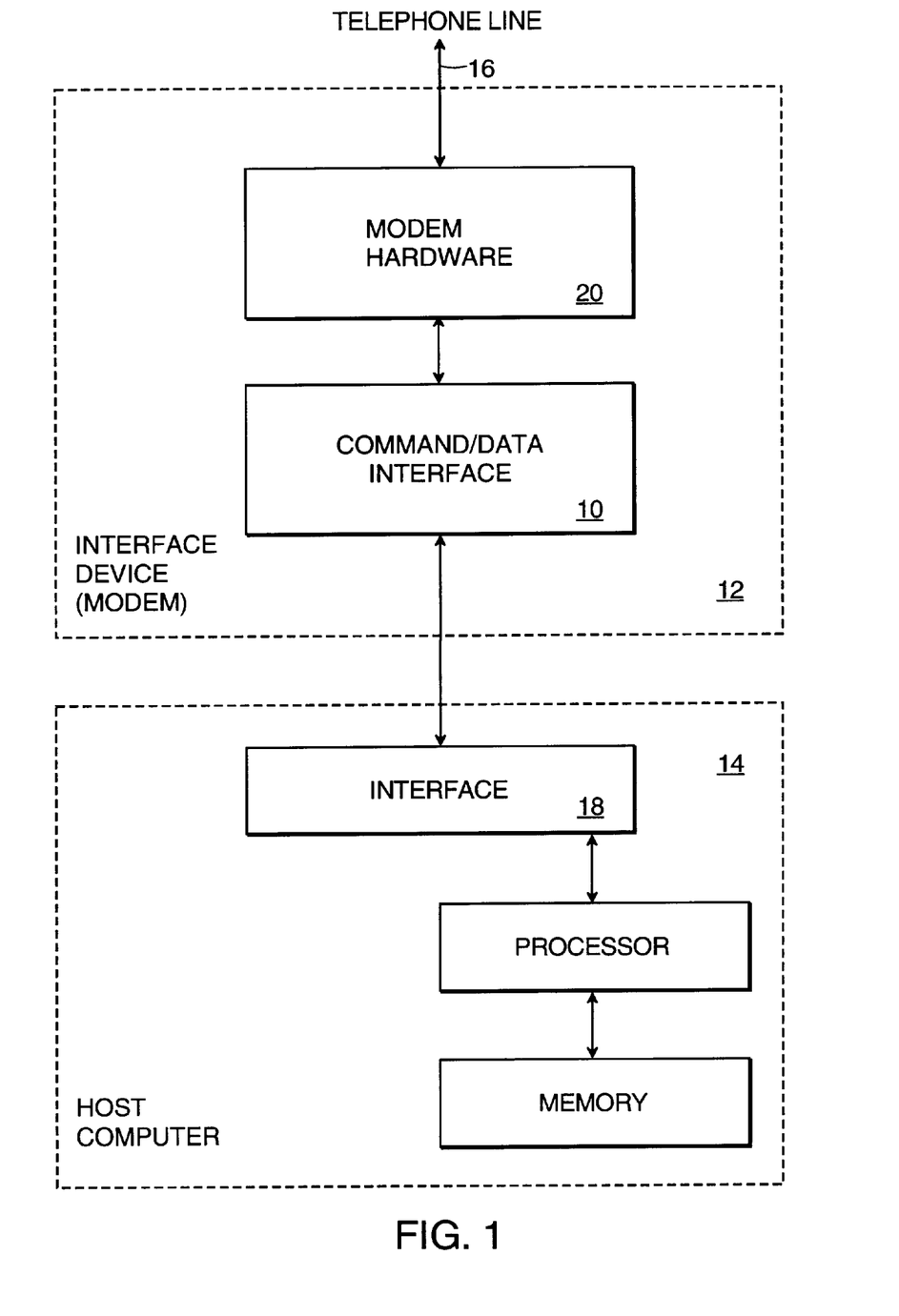
FIG. 1 is a schematic functional block diagram which illustrates the command/data interface of the invention.

FIG. 1 is a schematic functional block diagram which shows one embodiment of the command/data interface 10 of the invention located within an interface device 12. The interface device can be a modem or an ISDN terminal adapter or other device which provides an interface between the host computer 14 and the telephone line 16. The interface device 12 can be a device such as the "MICA™ unit" described in co-pending U.S. patent application Ser. No. 08/686,990, filed Jul. 25, 1996, entitled "Apparatus and Method for Processing Multiple Telephone Calls," assigned to the same assignee as the present application now U.S. Pat. No. 5,949,762. The contents of that co-pending application are incorporated herein in their entirety by reference.

The interface device 12 is controlled by an application, driver or user on the host computer 14 via an application programming interface (API) 18. An API 18 that can be used with the present application is described in a commonly assigned U.S. patent application Ser. No. 08/893,192 filed on even date herewith by Reine et al. for an Application Programming Interface for Modem and ISDN Processing. The contents of that pending patent application are incorporated herein in their entirety by reference.

The API 18 provides commands and data to the command/data interface 10 of the invention. In response, the command/data interface 10 generates appropriate commands and data and forwards them to the appropriate interface device hardware 20 to implement the commanded operation. The modem hardware 20 also provides the hardware and software interface to the telephone line 16.

As mentioned above, the command/data interface 10 of the invention can be used with the MICA unit described in U.S. patent application Ser. No. 08/686,990, incorporated above. The following description describes the interface 10 of the invention in terms of the MICA unit. It will be understood that the MICA unit is only used in the description as an exemplary illustration. The interface 10 of the invention is applicable to other interface devices that provide an interface between a computer and a telephone line.

Figure 2:
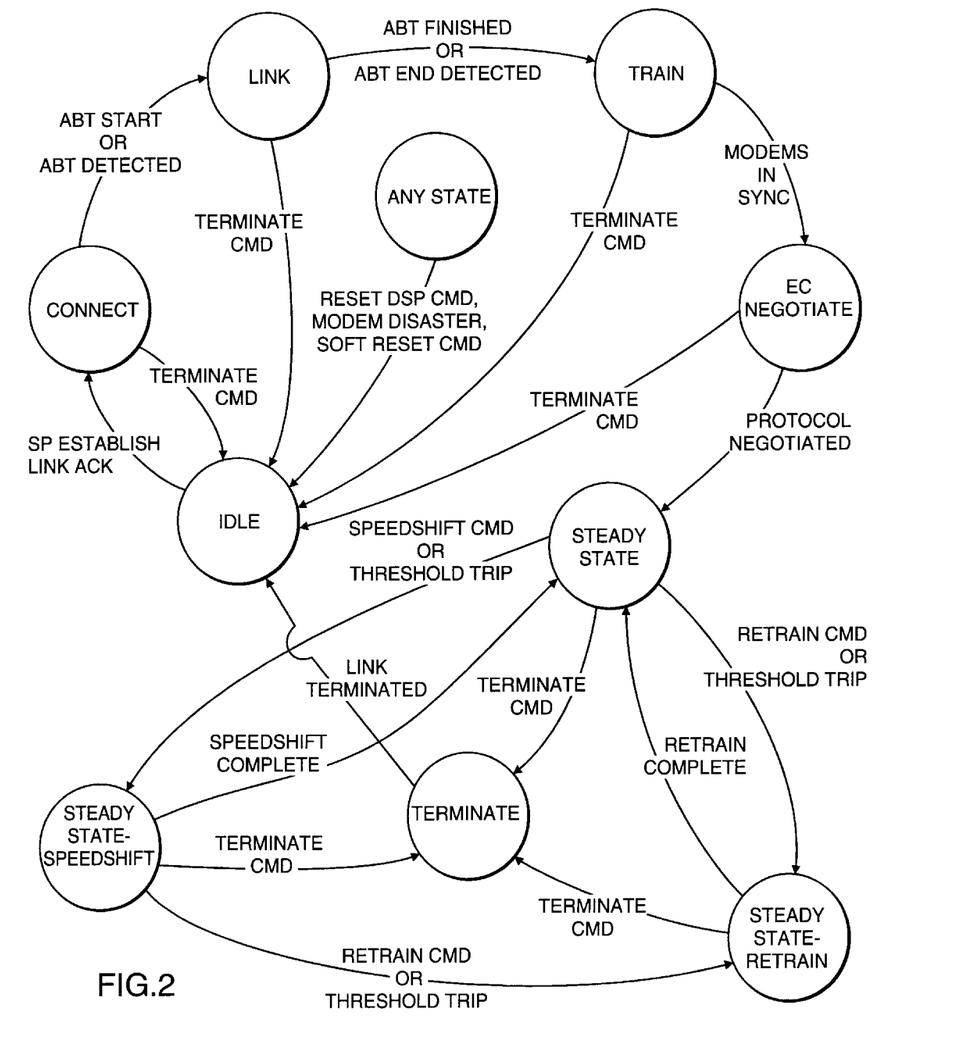
FIG. 2 is a schematic state diagram illustrating the states of a modem using the command/data interface of the present invention.

In one embodiment of the invention, the modem to which the command/data interface 10 of the invention is applicable has an internal state machine that identifies the different stages through which a link will progress. FIG. 2 is a schematic diagram which illustrates the eight states or stages of one modem to which the present invention is applicable.

In the IDLE state, the modem session is currently inactive. The IDLE state is entered from any state upon receiving a host SOFTWARE_RESET command (described below), or upon any failure during an active state.

Regarding the CONNECT state, in an ANSWER mode, a modem session has initiated activity but has not yet begun to produce an answerback tone. In an ORIGINATE state, a modem session has initiated activity but has not yet detected any answerback tone. The CONNECT state is entered from the IDLE state upon receiving a host command to INITIATE (described below).

Regarding the LINK state, in an ANSWER mode, a modem session is transmitting answerback tone to the line. In an ORIGINATE mode, a modem session has detected the minimum amount of answerback tone required. This indicates that there is a remote peer. The LINK state is entered from the CONNECT state upon detecting answerback tone (ORIGINATE) or the initiation of answerback tone generation (ANSWER).

In the TRAINUP state, a modem session is negotiating the physical modulation standard that is to be used during the link. The TRAINUP state is entered from the LINK state upon detecting the end of answerback tone (ORIGINATE) or completing transmission of answerback tone (ANSWER).

In the EC_NEGOTIATING state, a modem session is negotiation the error correction/data compression protocol that is to be used during the link. This state is entered from the TRAINUP state upon successfully completing the physical modulation synchronization.

In the STEADY_STATE state, the modem session is able to pass data on the link. STEADY_STATE is entered from the EC_NEGOTIATING state upon successful protocol negotiation, or from the STEADY_STATE_RETRAINING and STEADY_STATE_SHIFTINGSPEED states as the physical link is successfully renegotiated.

In the STEADY_STATE_RETRAINING state, a modem session is currently retraining. This state is entered from the STEADY_STATE or STEADY_STATE_SHIFTINGSPEED states upon the host issuing a LINK_CONTROL-[RETRAIN] command (described below) or by tripping an internal threshold (configurable).

In the STEADY_STATE_SHIFTINGSPEED state, a modem session is currently speed shifting. This state is entered from STEADY_STATE upon issuance from the host of a LINK_CONTROL-[FALLBACK, FALLFORWARD] or tripping an internal threshold (configurable).

In the TERMINATE state, a modem session is currently attempting to flush user data. The TERMINATE state is entered from any STEADY_STATE . . . upon host issuance of a TERMINATE_LINK command (described below).

The following global rules apply to the eight states. The IDLE state can be reached from any other state through a link failure or by the host commanding TERMINATE_LINK and SOFTWARE_RESET. A modem session will not spontaneously transition out of the IDLE state. In general, this transition requires an INITIATE command from the host. Once initiated by the INITIATE command, a modem session will pass sequentially through the following states: CONNECT, LINK, TRAINUP, EC_NEGOTIATING, and STEADY_STATE. The only exception would be an exit to the IDLE state caused by reasons mentioned above. The STATES STEADY_STATE_RETRAINING and STEADY_STATE_SHIFTINGSPEED states are logically child states to the STEADY_STATE state. As such, a modem that passes into these two states will eventually return to STEADY_STATE, or will exit to IDLE. Any transition between states will cause an expedited NOTIFICATION message (described below) from that modem session back to the host.

The interface 10 of the invention provides the necessary hardware and software to implement performance of all functions required to be performed by the interface device 12. To that end, the interface provides for downloading firmware to the modem hardware 20. It also provides for configuration of each individual interface device or modem processor dem session. Further, it allows for transfer of command and data information into and out of each modem session.

In one embodiment, communication between host 14 and the command/data interface 10 takes place across a shared DRAM memory interface. The DRAM memory is preferably included in the modem hardware 20. The implementation of the shared DRAM interface window utilizes twelve independent structures, one for each data/command flowing to the modem hardware 20 from the host 14 (transmit mode) and one for each data/command flowing to the host 14 from the modem hardware 20 (receive mode).

FIG. 3 is a schematic diagram illustrating the twelve structures. Structures 50A–50F are used in the transmit mode, and structures 50G–50L are used in the receive mode. Each structure 50 contains a one k-byte data block 52A–52L which is used as a circular queue. Each structure also includes a 16-bit HEAD pointer 54A–54L and a 16-bit TAIL pointer 56A–56L. Each HEAD pointer 54A–54L points to the head of its respective queue 52A–52L, and each TAIL 56A–56L points to the tail location of its respective queue 52A–52L. It should be noted that a data queue 52A–52L is in its empty condition when its respective HEAD pointer 54A–54L is equal to its respective TAIL pointer 56A–56L.

Each data structure 50A–50L also includes a 128-byte mailbox field 58A–58L. The mailbox field 58A–58L is used as described below for command and information communication between the modem hardware 20 and the host 14.

To maintain alignment with the 4 k-byte minimum DRAM window configuration available on the ISA bus, the structures 50A–50L can be padded out to 2 k-bytes each. To that end, each structure 50A–50L includes a pad field 60A–60L. In one embodiment, the data blocks are arranged such that the entire shared memory space can be accessed inside of a single 32 k-bytes ISA ASIC window, based upon the configuration option available from the ISA ASIC.

As mentioned above, in one embodiment, data is passed between the host computer 14 and the modem hardware 20 using byte-oriented circular queues, six for transmit data and six for receive data. These queues are controlled using the two 16-bit HEAD and TAIL pointers, 54A–54L and 56A–56L, respectively. These pointers are offsets from a fixed address, one for the head pointer and one for the tail pointer. The host computer 14 has ownership of all transmit.HEAD and receive.TAIL pointers, and modem hardware 20 has ownership of all the transmit.TAIL and receive-.HEAD pointers. In one embodiment, only the owner of a pointer can perform write operations on that pointer.

In one embodiment, in order to send data across the interface to the modem hardware, the host computer 14 performs the following actions. It first compares the HEAD pointer 54 to the associated TAIL pointer 56 of the targeted transmit queue 52 to determine if there is room for any data. If the comparison shows that there is free space available in the queue 52, then the host 14 proceeds in writing as much data as possible into the free byte positions. If the comparison shows that there is no room for new data, then the procedure is terminated. After data is written into the queue, an updated HEAD queue pointer 54 is transmitted across the ISA bus to indicate the amount of data that was written. It should be noted that the HEAD queue pointer 54 could be stored locally, thus eliminating the necessity of fetching across the ISA interface.

To retrieve data from the modem hardware 20, the host 14 performs the following actions. It first compares the HEAD pointer 54 to the associated TAIL pointer 56 of the targeted receive queue 52 to determine if there is any new data to be retrieved. If the comparison shows that new data is present, then the host 14 proceeds to retrieve as much data as possible. If the comparison that there is no data available, then the procedure terminates. After the data is retrieved, an updated TAIL pointer 56 is written across ISA bus to indicate the amount of data that was retrieved. It should be noted that the TAIL pointer 56 could also be stored locally, thus eliminating the necessity of fetching it across the ISA interface. The actions of the modem hardware 20 in transmitting or receiving data to and from the host 14 are identical to those described above, using the alternate pointers 54, 56 and queue 52.

In one embodiment, message units passed between the modem hardware 20 and the host computer 14 in the mailbox field 58A–58L are the principal form of communication between the host 14 and the modem hardware 20. Other forms of communication, such as direct query of the modem hardware DRAM exist, but are not relied upon primarily.

In one embodiment, the messages used to control the modem hardware 20 are of four types or categories, based on the modem hardware operations with which they are associated. One category is a configuration category in which information is transferred from the host 14 to the modem hardware 20 to define the actions or performance parameters for a modem session. A second category of messages is a command category in which information from the host computer 14 is used to direct the actions of a modem session. A third category is a query category in which the host 14 issues requests to a modem session for current status and/or statistical information. A fourth category of message is a notification message which is sent from a modem session to the host computer 14. In one embodiment, the information is unsolicited, that is, the host need not request the information from the modem hardware 20.

Figure 4:
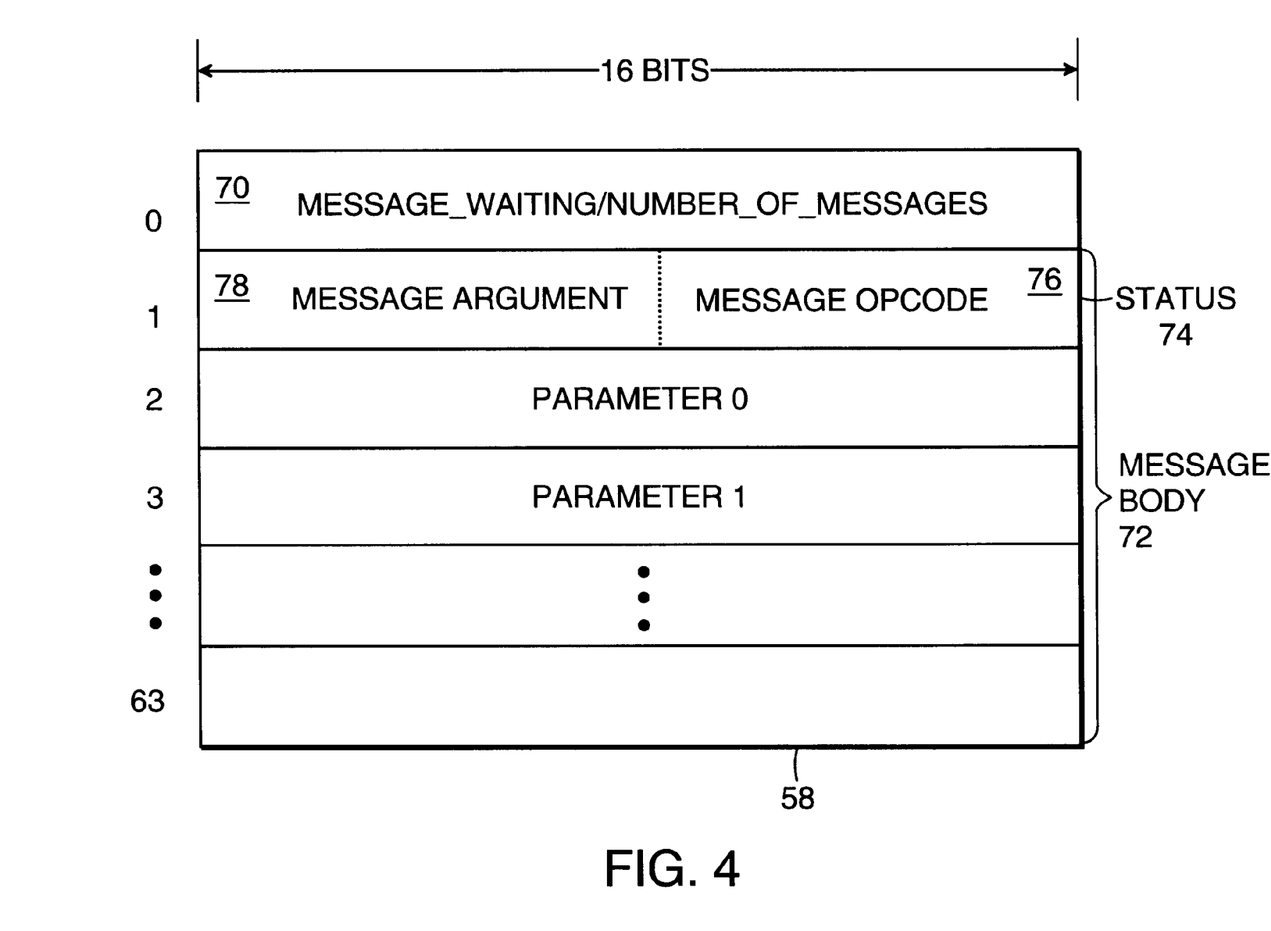
FIG. 4 is a schematic diagram illustrating the structure of a mailbox message in accordance with the present invention.

FIG. 4 is a schematic diagram which depicts the structure of one embodiment of a mailbox message 58. Mailboxes 58 are sixty-four 16-bit words long (128 bytes). The first 16-bit word of a mailbox is the message_waiting/number_of_messages word 70, and the remaining sixty-three words contain the message body 72. The first word of all messages in the mailbox body 72 is a status word 74 which includes two fields. The first field 76 contains the message opcode, and the second field 78 contains a message argument. Any parameters that cannot be included in the argument word 78 are appended to the status word 74 using additional 16-bit words, as shown in FIG. 4.

When it is desired to send a mail message from either the modem hardware 20 to the host computer 14, or from the host computer 14 to the modem hardware 20, the message_waiting/number_of messages field 70 is compared to zero. If it is non-zero, then previously sent message(s) has (have) not been processed yet. In that case, the message sending process is terminated. If message_waiting/number_of_messages is zero, then previously sent message(s) has (have) been processed. Messages to be sent are then written to the mailbox body 72, up to the length of the mailbox 58. Finally, the message_waiting/number_of_messages field 70 is written with the number of messages being sent.

When receiving a mail message, the message_waiting/number_of_messages field 70 is again compared to zero. If it is zero, then no mail is present to be processed, and the procedure is terminated. If message_waiting/number_of_messages field 70 is non-zero then mail is waiting to be processed. The message_waiting/number_of_messages field 70 is read, and the messages are parsed out of the mail box body 72. The mail is then read and processed. Next, the message_waiting/number_of_messages field 70 is zeroed to indicate that the mail has been processed, and the procedure is exited.

In one embodiment, the following rules are used for exchanging message units. When sending a message, the mailbox can only be written to if message_waiting/number_of_messages is zero. When sending, message_waiting/number_of_messages can only be set after all messages to be sent have been written. When sending, no more than the mailbox length 16-bit words can be sent in one pass. When receiving, message_waiting/number_of_messages can only be cleared after the entire contents of the mailbox body 72 have been processed. Messages cannot be fractured or split among multiple sends or receives.

FIG. 5 is a schematic diagram of a sample mailbox structure 58 in which a single message is sent. In this example, the message_waiting/number_of_messages field 70 is set to 1to indicate a single message. The opcode field 76 contains the 8-bit opcode for the message, and the argument field 78 contains an 8-bit message argument. The remaining fields in the mailbox include parameters 0 through N associated with the message.

FIG. 6 is a schematic diagram illustrating another example of a mailbox structure 58 where two messages are sent. In this example, the message_waiting/number_of_messages field 70 is set to 2. Field 76A includes the opcode for the first message and field 78A includes the argument for the first message. These are followed by, in general, 10 multiple fields containing parameters 0 through N for the first message. At the end of the first message, a second message status word 74B is written in the mailbox 58. It contains an opcode for the second message in field 76B and an argument for the second message in field 78B. These are again followed by additional parameters for the second message.

Table 1 illustrates the opcode ranges reserved for the various message types in one embodiment of the invention. It will be understood that these opcodes are used as exemplary illustrations only.

TABLE 1

Message Opcode Ranges

| MESSAGE TYPE | OPCODES |
| --- | --- |
| Notification | 1–7 |
| Configuration | 8–15 |
| Query | 16–31 |
| Command | 32–63 |
| Future | 64–127 |

They are also used in the following detailed description of individual messages. Again, they are used only as examples and not as limitations.

Each of the message categories and individual messages within each category will now be described in detail.

1. Configuration Message(s)

A modem controllable by the command/data interface 10 of the invention can contain a configuration block which defines everything necessary for it to operate. Table 2 contains configuration options and indices used by the interface of the invention. Each item inside the configuration block is individually accessible using the command DOWNLOAD CONFIGURATION PARAMETER (see paragraph 1.1)

TABLE 2

Configuration Options and Indices

| INDEX | DEFAULT | CONFIGURATION DESCRIPTION | VALUES |
| --- | --- | --- | --- |
| 1 | 0001 | Country Code | COUNTRY CODE |
| 2 | ANSWER | Originate/Answer Mode | 0 = Answer<br>1 = Originate |
| 3 | 8 | Data Bits Selection | 7/8/9 Data Bits |
| 4 | None | Parity Selection | 0 — No Parity<br>1 — Even Parity<br>2 — Odd Parity |
| 5 | 1 | Stop Bits Selection | 1/2 Stop Bits |
| 6 | Enabled | V.42 ODP generation | 0 = Disabled<br>1 = Generate ODP sequence when originating a call. |
| 7 | 50 | Error Correction Autodetect Timeout[1] (in 100 ms steps) | 0 = Run the detection mechanism until manual intervention or a pattern match. 0.1–25.5 seconds (0.1 second steps) inside which the modem will run an automated detection machine upon the incoming data. |
| 8 | 100 | Protocol Negotiation Timeout[1] (in 100 ms steps) | 0 = Wait indefinitely for protocol negotiation or manual intervention. 1 to 255 = 0.1–25.5 elapsed seconds (0.1 second steps) before unsuccessful negotiation causes fallback. |
| 9 | CR | Protocol Negotiation Fallback Character | 1 ASCII value, case and parity ignored. |
| 10 | 12 | Protocol Frame Retransmission Limit | 0 = Do not disconnect on excessive retransmission<br>1 to 255 = 1–255 successive frame retransmissions causes disconnect. |
| 11 | 256 | Error Correction Frame Length | Buffer length: 64 to 1024 octets of data. (Error Correction Window is (8192/<Buffer length>) |
| 12 | V42bis | Data Compression | 0 = Disabled<br>1 = V.42bis<br>2 = MNP5<br>3 = V.42bis and MNP5 (V.42bis has precedence) |
| 13 | Disabled | ARA Error Correction[2] | 0 = ARA1.0 & ARA2.0 Disabled<br>1 = ARA.1 & ARA2.0 Enabled for Answer only<br>2 = ARA1.0 & ARA2.0 Enabled for Answer, originate ARA1.0<br>3 = ARA1.0 & ARA2.0 Enabled for Answer, originate ARA2.0 |
| 14 | Enabled | V.42 Error Correction (LAP-Modem)[2] | 0 = V.42 (LAP-M) Disabled<br>1 = V.42 (LAP-M) Originate & Answer enabled |
| 15 | Enabled | MNP Error Correction[2] | 0 = MNP Disabled<br>1 = MNP Originate & Answer enabled |
| 16 | ASYNC | Link Protocol Fallback[2] | 0 = Asynchronous framing (Start/Stop/Parity)<br>1 = Synchronous Framing (Raw 8 bits to DSP)<br>2 = Disconnect (Hangup) |

TABLE 2-continued

Configuration Options and Indices

| INDEX | DEFAULT | CONFIGURATION DESCRIPTION | VALUES |
|---|---|---|---|
| 17 | — | DSP processor MVIP TDM slice (HEX ASIC slot allocation register) | 0–15 |
| 18 | Disabled | Calling Tone | 0 = Disabled<br>1 = Send calling tone |
| 19 | Disabled | Guard Tone | 0 = Guard tone disabled<br>1 = Use Guard tone (V.22 & V.22bis only) |
| 20 | V.34bis Auto | Modem Standard[3] | 0 = V.34bis Automode, with terbo<br>1 = V.34bis Automode, skip terbo<br>2 = V.32bis terbo Automode<br>3 = V.32bis Automode<br>4 = V22bis Automode |
| 21 | 28800 (FU def will be 33600) | Max Connect Rate[3] | 0. INVALID 1. 75 bps 2. 300 bps<br>3. 600 bps 4. 1200 bps<br>5. 2400 bps 6. 4800 bps<br>7. 7200 bps 8. 9600 bps<br>9. 12000 bps 10. 14400 bps<br>11. 16800 bps 12. 19200 bps<br>13. 21600 bps 14. 24000 bps<br>15. 26400 bps 16. 28800 bps<br>17. 31200 bps 18. 33600 bps |
| 22 | 300 (FU def will be 75) | Min Connect Rate[3] | 0. INVALID 1. 75 bps 2. 300 bps<br>3. 600 bps 4. 1200 bps<br>5. 2400 bps 6. 4800 bps<br>7. 7200 bps 8. 9600 bps<br>9. 12000 bps 10. 14400 bps<br>11. 16800 bps 12. 19200 bps<br>13. 21600 bps 14. 24000 bps<br>15. 26400 bps 16. 28800 bps<br>17. 31200 bps 18. 33600 bps |
| 23 | 2 | Signal Quality Threshold | 0 = No action on bit errors<br>1 = Bit Errors >= 1:100 cause recovery<br>2 = Bit Errors >= 1:1000 cause recovery<br>3 = Bit Errors >= 1:10000 cause recovery<br>4 = Bit Errors >= 1:100000 cause recovery<br>5 = Bit Errors >= 1:1000000 cause recovery |
| 24 | 500 | Fallback/Fallforward Squelch Timer (in 1 ms steps) | Time to Delay after a speed shift before allowing another speed shift |
| 25 | 1000 | Fall Forward Timer (in 10 ms steps) | 0 = disabled<br>1 to 255 = 1–255 sequential seconds (1 second steps) of good signal quality causes fall forward. |
| 26 | 50 | Fall Back Timer (in 10 ms steps) | 0 = disabled<br>1 to 255 = 1–2.55 sequential seconds (.01 second steps) of poor signal quality cases fall back. |
| 27 | 20 | Terminate Timeout (in 1 second steps) | Max time after a disconnect request to delay before forcing link disconnect. |
| 28 | 40 | Wait for data mode time-out (in 1 second steps) | 0 = Wait indefinitely for data mode<br>1 to 255 = 1–255 elapsed seconds (1 second steps) before physical link established causes disconnect. |
| 29 | 14 | Lost carrier to hang-up delay (in 100 ms steps) | 0 = Do not disconnect on carrier loss 1 to 255 = 0.1–25.5 elapsed seconds (0.1 second steps) without carrier causes link disconnect. |
| 30 | 9 | Transmit Level Setting | 0–15dBm |
| 31 | 4 | Consecutive retrain disconnect threshold | 0 = Do not disconnect on excessive retrains<br>1 to 255 = 1–255 successive failed retrains causes link disconnect. |
| 32 | 3429 | V34 Maximum Symbol Rate | 0:2400 Baud 3:3000 Baud<br>1:2743 Baud 4:3200 Baud<br>2:2800 Baud 5:3429 Baud |
| 33 | 2400 | V34 Minimum Symbol Rate | 0:2400 Baud 3:3000 Baud<br>1:2743 Baud 4:3200 Baud<br>2:2800 Baud 5:3429 Baud |

TABLE 2-continued

Configuration Options and Indices

| INDEX | DEFAULT | CONFIGURATION DESCRIPTION | VALUES |
|---|---|---|---|
| 34 | Auto | V.34 Carrier Frequency | 0:Low Carrier<br>1:High Carrier<br>2:Auto Carrier Selection |
| 35 | Auto | v34 Preemphasis Filter Selection | 0 through 10<br>11: Automatic Preemphasis Selection |

[1]If the setting of the autodetect timeout exceeds that of the protocol negotiation timeout, then the autodetect timeout will be limited to the duration set in the protocol negotiation timeout. Otherwise, these two timers run in parallel.
[2]For protocol establishment, the configuration options for ARA, V. 42, MNP and fallback interwork according to Table 3 below. The hierarchy of the table determines which protocol is attempted first. Therefore, to implement a modem session which connect in ARA LAP-M or MNP (in that order of preference), options would be set as follows: ARA[1] V.42[1] MNP[1].

[1]If the setting of the autodetect timeout exceeds that of the protocol negotiation timeout, then the autodetect timeout will be limited to the duration set in the protocol negotiation timeout. Otherwise, these two timers run in parallel.

[2]For protocol establishment, the configuration options for ARA, V. 42, MNP and fallback interwork according to Table 3 below. The hierarchy of the table determines which tocol is attempted first. Therefore, to implement a modem session which connect in ARA LAP-M or MNP (in that order of preference), options would be set as follows: ARA[1] V. 42[1] MNP[1].

TABLE 3

| OPTION SET | ORIGINATE MODE | ANSWER MODE |
|---|---|---|
| ARA-0 | No Action | No Action |
| ARA-1 | No Action | If presented with any ARA mode, respond in kind and attempt to link. |
| ARA-2 | Send ARA1.0 LR expect like response. | If presented with any ARA mode, respond in kind and attempt to link. |
| ARA-3 | Send ARA2.0 LR expect like response. | If presented with any ARA mode, respond in kind and attempt to link. |
| V.42-0 | No Action | No Action |
| V.42-1 | Send ODP pattern, look for 11 sequential HDLC flags and ADP pattern. If any of the above detected, Send V.42 XID negotiation frame. Expect like response. | Look for 11 Sequential HDLC flags or ODP pattern. If any of the above detected, look for V.42 XID frame. If detected, respond in kind. |
| MNP-0 | No Action | No Action |
| MNP-1 | Send MNP LR negotiation frame. Look for like response. | Look for SYN-DLE-STX-LR sequence. If detected, respond in kind. |

[3]The configuration options for STANDARD, MAX RATE, and MIN RATE must all be downloaded according to Table 4 below.

TABLE 4

| STANDARD | MAX RATE | MIN RATE | POTENTIAL STANDARD |
|---|---|---|---|
| V.34 Auto, with terbo | 28800 bps | 300 bps | V.21 (Bell103), V.22, V.22bis (Bell212), V.23, V.32V.32bis, V.32terbo, V.34, V.34bis |
| V.34 Auto, no terbo | 28800 bps | 300 bps | V.21 (Bell103), V.22, V.22bis (Bell212), V.23, V.32, V.32bis, V.34, V.3bis |
| V.32terbo Auto | 19200 bps | 300 bps | V.21 (Bell103), V.22, V.22bis (Bell212), V.23, V.32, V.32bis, V.32terbo |
| V.32bis Auto | 14400 bps | 300 bps | V.21 (Bell103), V.22, V.22bis (Bell212), V.23, V.32, V.32bis |
| V.22bis Auto | 2400 bps | 300 bps | V.21 (Bell103), V.22, V.22bis (Bell212), V.23 |

1.1. DOWNLOAD_CONFIGURATION_PARAMETER[parameter][value]

This message is used to pass down all necessary operating information used to set the configuration of the modem hardware 20. This includes the equivalent of AT type S-registers and country-specific information necessary for international compliance and interoperability. If this command is issued during a connection, no action is taken until after the device has returned to the IDLE state. A sample format for the command as follows:

| FIELD NAME | VALUE | MEANING |
|---|---|---|
| Command Opcode | 0x7 | Download Configuration Parameter |
| Argument | α | 0–255: Index of the parameter to be set (See Table 2 for full descriptions). |
| Parameter | α | Value associated with above index. |

The structure of the message is of the form shown in Table 5.

TABLE 5

| BIT 15 | BIT 14 | BIT 13 | BIT 12 | BIT 11 | BIT 10 | BIT 9 | BIT 8 | BIT 7 | BIT 6 | BIT 5 | BIT 4 | BIT 3 | BIT 2 | BIT 1 | BIT 0 |
|---|---|---|---|---|---|---|---|---|---|---|---|---|---|---|---|
| Argument | | | | | | | | reserved | | | Command Opcode | | | | |
| Parameter | | | | | | | | | | | | | | | |

A sample format for the response to the message is as follows:

| FIELD NAME | VALUE | MEANING |
|---|---|---|
| Command Opcode | 0x7 | Download Configuration Parameter |
| Argument | α | 0: Command accepted, option set<br>1: Unable to complete command |

The structure of the response message can be of the form shown in Table 6.

TABLE 6

| BIT 15 | BIT 14 | BIT 13 | BIT 12 | BIT 11 | BIT 10 | BIT 9 | BIT 8 | BIT 7 | BIT 6 | BIT 5 | BIT 4 | BIT 3 | BIT 2 | BIT 1 | BIT 0 |
|---|---|---|---|---|---|---|---|---|---|---|---|---|---|---|---|
| Argument | | | | | | | | reserved | | | Command Opcode | | | | |

2. Command Messages

The following command messages are used to force a corresponding action in the modem hardware 20.

2.1 INITIATE_LINK

This command is used to drive the modem hardware 20 out of the IDLE state and into the CONNECT state. The modem refers to the configuration to determine whether to perform ORIGINATE or ANSWER activity. From this state, the modem will automatically attempt to connect with a remote peer. A format for the command is as follows:

| FIELD NAME | VALUE | MEANING |
|---|---|---|
| Command Opcode | 0x20 | Initiate Link |
| Argument | 0 | No arguments |

A sample format for the response to the command is as follows:

| FIELD NAME | VALUE | MEANING |
|---|---|---|
| Command Opcode | 0x20 | Initiate Link |
| Argument | α | 0: Command accepted, link initiated<br>1: Unable to Initiate Link |

The structure for the response and the command is of the type shown in Table 6.

2.2 TERMINATE_LINK

This command orders the targeted modem to terminate any action presently under way. Once completed, the modem will return to the IDLE state and re-initialize its internal state to that which preceded the link. A format for the command is as follows:

| FIELD NAME | VALUE | MEANING |
|---|---|---|
| Command Opcode | 0x21 | Terminate Link |
| Argument | α | 0: Flush data<br>1: Do not flush data |

A format for the response to the command is as follows:

| FIELD NAME | VALUE | MEANING |
|---|---|---|
| Command Opcode | 0x21 | Terminate Link |
| Argument | 0 | Command accepted |

The structure for both the command and the response are of the type shown in Table 6. It should be noted that if the modem is currently in STEADY_STATE, then it will attempt an orderly termination of the link. This constitutes flushing any data present in the transmit path and trying to negotiate a cleardown. If the modem is not in STEADY_STATE, then any fink activity is immediately terminated.

2.3 SOFTWARE_RESET

This command is used to immediately drive any modem session to the IDLE condition. On completion, the modem will be in the IDLE state with its internal state re-initialized to that which preceded the link activity. This command differs from TERMINATE_LINK in that regardless of the current state or configuration, when the SOFTWARE_RESET command is used, the modem will not attempt to negotiate a cleardown, but will return immediately to the IDLE condition. This can be used in place of the TERMINATE_LINK command if there is no desire to terminate cleanly and to preserve outgoing user data. A sample format for the command is as follows:

| FIELD NAME | VALUE | MEANING |
|---|---|---|
| Command Opcode | 0x22 | Software Reset |
| Argument | 0 | No arguments |

A sample format for the response for the command is as follows:

| FIELD NAME | VALUE | MEANING |
|---|---|---|
| Command Opcode | 0x22 | Software Reset |
| Argument | 0 | Command Accepted |

The structure for both the command and the response is of the type shown in Table 6.

2.4 LINK_CONTROL—[fallback, fall-forward, retrain]

This command is used to manually command a modem session to perform any of the three listed operations. The FALLBACK/FALL-FORWARD operations will initiate quick speed-shifts where possible (V.32bis, V.32terbo, V.34, V.34bis), but where not possible they will initiate a speed-shift through a full retrain (V.32, V.22bis). It should be noted that the modem will only attempt to perform the action desired if it is currently in a STEADY_STATE state. Before that point in the link, a modem will not attempt to satisfy the command request. The ability of the modem to perform the different options available will vary depending upon the connected standard. Every standard has a different matrix of available speeds and capabilities which may or may not allow command execution. A sample format for the LINK CONTROL command is as follows:

| FIELD NAME | VALUE | MEANING |
|---|---|---|
| Command Opcode | 0x23 | Link Control |
| Argument | α | 0: Fallback<br>1: Fall-Forward<br>2: Retrain |

A sample format for the response to the command is as follows:

| FIELD NAME | VALUE | MEANING |
|---|---|---|
| Command Opcode | 0x23 | Link Control |
| Argument | α | 0: Command accepted, attempting action<br>1: Unable to accept command |

The structure for both the command and the response is of the form shown in Table 6.

The FALLBACK command causes the targeted modem to fallback (when available to the modulation standard) one 2400 step. This means that if the affected modem is at 28800 bps, that it will fallback to 26400 bps. It should be noted that the ability to fallback to a slower rate depends upon the rates available to the connected modulation standard. If the standard can not go slower then the modem will not fallback.

The FALL-FORWARD command causes the targeted modem to fall forward using a speed shift (when available to the modulation standard) of one 2400 step. This means that if the affected modem is at 9600 bps, it will fall forward to 12000 bps. It should be noted that the ability to fall forward to a higher rate depends upon the rates available to the connected modulation standard and the quality of the link. If the standard cannot go faster or the link cannot sustain a higher rate, then the modem will not fall forward.

The RETRAIN command causes the targeted modem to initiate a full retrain. This causes a complete recharacterization of the link. The rate at which the modem connects after this retrain depends upon the quality of the link and the connected standard.

2.5 INITIATE_TEST—[LLB, LDL][ST]

This command is used to initiate certain diagnostics on a given modem session. A format for the command is as follows:

| FIELD NAME | VALUE | MEANING |
|---|---|---|
| Command Opcode | 0x24 | Initiate Test |
| Argument | α | 0: (LLB) Local Loop Back<br>1: (LDL) Local Digital Loopback<br>2: (LLB) Local Loop Back with Self Test<br>3: (ECLLB) Error Corrected Loopback |

A format for the response to the command is as follows:

| FIELD NAME | VALUE | MEANING |
|---|---|---|
| Command Opcode | 0x24 | Initiate Test |
| Argument | α | 0: Command accepted, initiating test<br>1: Unable to accept command |

The structure for both the command and the response is of the form shown in Table 6.

The ST (Self Test) command causes the targeted modem to source and verify data in order to generate BER results. The results of such a self test can be retrieved using the LINK INFO—MENU [test results]. The LLB command causes the targeted modem to initiate its equivalent of an analog loopback in the signal processor. Any data received from the host will be processed according to the selected compression and error correction standards, passed to the associated signal processing session, looped back using the selected modulation standard, and returned to the host using the same error correction and data compression standards mentioned above. It should be noted that this command will only be parsed if the modem is currently in the IDLE state. If the modem is in any active state, then it will not be acted upon.

The LDL command causes the targeted modem to initiate a loopback of the receive data just before the data would be passed to the host. This means that any information received on the line is decoded according to the negotiated/configured error correction, modulation, and compression standards, and is looped back just prior to the host interface. It should be noted that this command will only be acted upon if the modem is currently in any state other than IDLE. If the modem is in the IDLE state, then no action will be taken.

2.6 TERMNATE_TEST_MODE

This command is used to terminate a test that is currently running on a modem session. Once completed, the targeted modem will drop into the IDLE state. A format for the command is as follows:

| FIELD NAME | VALUE | MEANING |
|---|---|---|
| Command Opcode | 0x25 | Terminate Test Mode |
| Argument | 0 | No Arguments |

A format for the response to the command is as follows:

| FIELD NAME | VALUE | MEANING |
|---|---|---|
| Command Opcode | 0x25 | Terminate Test Mode |
| Argument | 0 | Command accepted |

The structure for both the command and the response is of the form shown in Table 6.

2.7 PASSTHRU_TO_DSP[ . . . ]

This command takes any parameters/information and passes them directly through to a given DSP session. The definitions in this command change depending upon developer requirements. A sample format for the command is as follows:

| FIELD NAME | VALUE | MEANING |
|---|---|---|
| Command Opcode | 0X26 | Passthrough to DSP |
| Argument | α | parameter Count |
| Parameters |  | Optional |

A sample format of the response is as follows:

| FIELD NAME | VALUE | MEANING |
|---|---|---|
| Command Opcode | 0x26 | Passthru to DSP |
| Argument | 0 | Command accepted |

The structure of the command is of the form shown in Table 7.

A format for the response of the form shown in Table 6.

2.8 RESET_DSP

This command causes the control process to toggle the reset strobe to the selected DSP processor. This will cause that DSP to either halt processing and reset its internal state or begin execution from its software reset vector. It should be noted that this command will reset both SP sessions running on the targeted DSP in a MICA modem setting. It will be implemented regardless of the state of the SP sessions. Therefore, usage of this command should be limited to drastic recovery only. A sample format for the command is as follows:

| FIELD NAME | VALUE | MEANING |
|---|---|---|
| Command Opcode | 0x27 | Reset DSP |
| Argument | 0 | No argument |

A sample format for the response to the command is as follows:

| FIELD NAME | VALUE | MEANING |
|---|---|---|
| Command Opcode | 0x27 | Reset DSP |
| Argument | 0 | Command accepted |

The structure for both command and the response is of the form shown in Table 6.

3. Query Messages

The following messages are used to retrieve various pieces of information for statistical generation and decision making purposes. They are set up such that there are a few options which return fixed groupings of information for efficiency, and there are a few options through which the host 14 can access most information to be gathered from the targeted modem session. Appendix A includes a complete list of the available information, what information is available in each grouping and the parameters associated with the assigned groups (see Table A-1).

3.1 RETURN_DEVICE_STATUS

This command is used to force a MODEM_STATE_TRANSITION message (see paragraph 4.1) to determine the current state of a selected device. Any other information retrieved other than the current state shall be requested by name or grouping by the host on an as needed basis (see paragraph 3.2 and Appendix A). A sample format for the command is as follows:

TABLE 7

| BIT 15 | BIT 14 | BIT 13 | BIT 12 | BIT 11 | BIT 10 | BIT 9 | BIT 8 | BIT 7 | BIT 6 | BIT 5 | BIT 4 | BIT 3 | BIT 2 | BIT 1 | BIT 0 |
|---|---|---|---|---|---|---|---|---|---|---|---|---|---|---|---|
| Argument | | | | | | | | rsv ed | Command Opcode | | | | | | |
| Parameter . . . | | | | | | | | | | | | | | | |

| FIELD NAME | VALUE | MEANING |
|---|---|---|
| Command Opcode | 0x10 | Return Device Status |
| Argument | 0 | No Argument |

A format for the response to the command is as follows:

| FIELD NAME | VALUE | MEANING |
|---|---|---|
| Command Opcode | 0x01 | Modem State Transition |
| Argument | α | 0: IDLE<br>1: CONNECT<br>2: LINK<br>3: TRAINUP<br>4: EC NEGOTIATING<br>5: STEADY STATE<br>6: STEADY STATE RETRAINING<br>7: STEADY_STATE SHIFTINGSPEED<br>8: TERMINATING |

The structure of both the command and the response is of the form shown in Table 6.

3.2 RETURN_LINK_INFORMATION—[static, dynamic, final, menu[ . . . ]]

This command is used to obtain information from a given modem regarding the link state. There are two approaches to obtain information, by grouping and by direct selection. The groupings are defined as follows:

STATIC: Information which is stable on entrance into the STEADY_STATE state. This information cannot change except with radical renegotiation on the link or a complete reconnect. This information is intended to be recovered every time the modem transitions into the STEADY_STATE state.

DYNAMIC: Information which has the potential to drift during the course of the link.

FINAL: Information which is only relevant after the modem has transitioned from an active (anything other than the IDLE state) to the IDLE state.

A format for the command is as follows:

| FIELD NAME | VALUE | MEANING |
|---|---|---|
| Command Opcode | 0x11 | Link Information |
| Argument | α | 0 . . . 127: Index of the desired modem link option (See APPENDIX A, Available Link Information and Groupings, for full descriptions). |

*-continued*

| FIELD NAME | VALUE | MEANING |
|---|---|---|
| | | 128: STATIC |
| | | 129: DYNAMIC |
| | | 130: FINAL |

The format for the response to the command is as follows:

| FIELD NAME | VALUE | MEANING |
|---|---|---|
| Command Opcode | 0x11 | Link Information |
| Argument | 0 | No Argument |
| Parameter Count | α | n Extended byte(s) |
| Parameter #1 | α | 0–255: See Appendix A, Available Link Information and Groupings for full descriptions. |
| Parameter #2 | α | Values of desired information (Parameter Count -1) word-16s in length. |

The structure of the command is of the form shown in Table 6. The structure for the response to the command is of the form shown in Table 8.

TABLE 8

| BIT 15 | BIT 14 | BIT 13 | BIT 12 | BIT 11 | BIT 10 | BIT 9 | BIT 8 | BIT 7 | BIT 6 | BIT 5 | BIT 4 | BIT 3 | BIT 2 | BIT 1 | BIT 0 |
|---|---|---|---|---|---|---|---|---|---|---|---|---|---|---|---|
| Argument | | | | | | | | reserved | | | Command Opcode | | | | |
| Parameter Count | | | | | | | | | | | | | | | |
| Parameters . . . | | | | | | | | | | | | | | | |

4. Notification Messages

The following messages are either used to pass development-specific commands through the host API to a given modem session or are set up to pass unsolicited information from a given modem session to the host.

4.1 MODEM_STATE_TRANSITION

This command is used to notify the host that a given modem session has gone through a state transition. Any other information retrieval other than the current state can be asked for by name or grouping by the host on an as needed basis (see paragraph 3.2 and Appendix A). A format for the message, in response form, is as follows:

| FIELD NAME | VALUE | MEANING |
|---|---|---|
| Command Opcode | 0x01 | Modem State Transition |
| Argument | α | 0: IDLE<br>1: CONNECT<br>2: LINK<br>3: TRAINUP |

| FIELD NAME | VALUE | MEANING |
|---|---|---|
| | 4: EC NEGOTIATING | |
| | 5: STEAD_STATE | |
| | 6: STEAD_STATE_RETRAINING | |
| | 7: STEADY_STATE_SHIFTINGSPEED | |
| | 8: TERMINATING | |

The RETURN_DEVICE_STATUS command described in paragraph 3.1 can be used to command this status information on an as needed basis.

4.2 DIAGNOSTIC_RESULTS [DSP0[ . . . ], DSP1[ . . . ], DSP2[ . . . ], RISC[ . . . ]]

This response is passed back to the host after the modem has completed self diagnostics. The results returned will have separate result fields for each processor. Each result field will have a single numeric parameter associated with it which will identify the test that failed. In the event that the diagnostics passed without failure, the numeric result will be NULL. A format for the message, in response form, is as follows:

| FIELD NAME | VALUE | MEANING |
|---|---|---|
| Command Opcode | 0x02 | Diagnostic Results |
| Argument | 0 | No Argument |
| Parameter #1 | α | DSP0 Diagnostic results |
| Parameter #2 | α | DSP1 Diagnostic results |
| Parameter #3 | α | DSP2 Diagnostic results |
| Parameter #4 | α | RISC diagnostic results |

Diagnostic results for the DSP process or shall return one of the following results:
0: DSP processor OK
1: SRAM test failure
2: DSP processor failure
3: MVP I serial channel failure
4: HEX ASIC access failure
Diagnostic results for the RISC processor shall return one of the following results:
0: RISC processor OK
1: RISC processor failure
2: DRAM failure
3: HEX ASIC failure
A structure for the response is of the form shown in Table 9.

TABLE 9

| BIT 15 | BIT 14 | BIT 13 | BIT 12 | BIT 11 | BIT 10 | BIT 9 | BIT 8 | BIT 7 | BIT 6 | BIT 5 | BIT 4 | BIT 3 | BIT 2 | BIT 1 | BIT 0 |
|---|---|---|---|---|---|---|---|---|---|---|---|---|---|---|---|
| Argument | | | | | | | | rsved | | | Command Opcode | | | | |
| Parameter #1 | | | | | | | | | | | | | | | |
| Parameter #2 | | | | | | | | | | | | | | | |
| Parameter #3 | | | | | | | | | | | | | | | |
| Parameter #4 | | | | | | | | | | | | | | | |

While this invention has been particularly shown and described with references to preferred embodiments thereof, it will be understood by those skilled in the art that various changes in form and details may be made therein without departing from the spirit and scope of the invention as defined by the appended claims.

APPENDIX A

Available Link Information and Groupings

STATIC PARAMETER GROUPING:

Error Correction Protocol
Compression Protocol
Connected Modulation Standard
Symbol Rate
Carrier Frequency
Trellis Coding
Frequency Offset
Round Trip Delay
Transmit Bit Rate
Receive Bit Rate
DYNAMIC PARAMETER GROUPING:

Signal Quality Value of Merit
Signal to Noise Ratio
Receive Signal Level1
Phase Jitter Frequency

APPENDIX A-continued

Available Link Information and Groupings

Phase Jitter Level
Far End Echo Level
Phase Roll
Total Retrain Count
Total EC Retransmission Count
FINAL PARAMETER GROUPING:

Total Call Time
Disconnect Reason
Total Retrain Count
Total EC Retransmission Count
Line Rate Histogram

| INDEX | LENGTH | RESPONSE NAME | RESPONSE PARAMETER |
|---|---|---|---|
| 0 | 1 byte | Disconnect Reason | 0. Host initiated link drop<br>1. No answer tone detected<br>2. Trainup Failure<br>3. Link lost due to analog carrier loss<br>4. Link lost due to excessive retrains<br>5. Link loss due to excessive EC re-transmissions<br>6. Link terminate initiated by remote modem<br>7. Fallback to Terminate |
|  | 1 byte | Fill for alignment | 0 |
| 1 | 1 byte | Connect Protocol | 0. SYNC Mode    3. ARA2.0<br>1. ASYNC Mode   4. LAP-M<br>2. ARA1.0        5. MNP |
|  | 1 byte | Fill for alignment | 0 |
| 2 | 1 byte | Compression | 0. None<br>1. V.42bis data compression<br>2. MNP5 data compression |
|  | 1 byte | Fill for alignment | 0 |
| 3 | 1 word-16 | EC Retranmission Count | Count of total error correction re-transmissions which occurred during the course of the link. |
| 4 | 1 word-16 | Self Test Error Count | Total errors generated during a self test run. |
| 5 | 1 word-32 | Call Timer | In seconds |
| 6 | 16 word-32 | Line Rate Histogram | 16 elements, corresponding to the link rates of 300, 600, 1200, 2400, 4800, 7200, 9600, 12000, 14400, 19200, 21600, 24000, 26400, 28800, 31200, 33600. Each element contains the total active time spent at that given rate (in seconds). |
| 7 | 1 word-16 | Total Retrains | Count of total retrains. |
| 8 | 1 byte | Sq. Value | 0 through 7 where 0 is the worst |
|  | 1 byte | Fill for alignment | 0 |
| 9 | 1 word-16 | Connected Standard | 0. V.21    4. V.32     8. V.34bis<br>1. V.22    5. V.32bis  9. Bell103<br>2. V.22bis 6. V.32terbo 10. Bell212<br>3. V.23    7. V.34 |
| 10 | 1 byte | RX Bit Rate | 0. INVALID 1. 75 bps 2. 300 bps<br>3. 600 bps 4. 1200 bps 5. 2400 bps<br>6. 4800 bps 7. 7200 bps 8. 9600 bps<br>9. 12000 bps 10. 14400 bps<br>11. 16800 bps 12. 19200 bps<br>13. 21600 bps 14. 24000 bps<br>15. 26400 bps 16. 28800 bps<br>17. 31200 bps 18. 33600 bps<br>0. INVALID 1. 75 bps 2. 300 bps<br>3. 600 bps 4. 1200 bps 5. 2400 bps<br>6. 4800 bps 7. 7200 bps 8. 9600 bps<br>9. 12000 bps 10. 14400 bps<br>11. 16800 bps 12. 19200 bps<br>13. 21600 bps 14. 24000 bps<br>15. 26400 bps 16. 28800 bps |
|  | 1 byte | TX Bit Rate | 17. 31200 bps 18. 33600 bps |
| 11 | 1 byte | RX Symbol Rate[1] | 0. 75 1. 300 2. 600 3. 1200 4. 2400<br>5. 2743 6. 2800 7. 3000 8. 2300<br>9. 3429 15. INVALID<br>0. 75 1. 300 2. 600 3. 1200 4. 2400<br>5. 2743 6. 2800 7. 3000 8. 2300 |
|  | 1 byte | TX Symbol Rate[1] | 9. 3429 15. INVALID |
| 12 | 1 byte | RX Carrier Frequency[1] | 0. 420 1. 1080 2. 1200 3. 1600 |

APPENDIX A-continued

Available Link Information and Groupings

|    |            |                                     |                                                                                                                                                   |
|----|------------|-------------------------------------|---------------------------------------------------------------------------------------------------------------------------------------------------|
|    |            |                                     | 4. 1646 5. 1680 6. 1700 7. 1750                                                                                                                   |
|    |            |                                     | 8. 1800 9. 1829 10. 1867 11. 1920                                                                                                                 |
|    |            |                                     | 12. 1959 13. 2000 14. 2400                                                                                                                        |
|    |            |                                     | 15. INVALID                                                                                                                                       |
|    |            |                                     | 0. 420 1. 1080 2. 1200 3. 1600                                                                                                                    |
|    |            |                                     | 4. 1646 5. 1680 6. 1700 7. 1750                                                                                                                   |
|    |            |                                     | 8. 1800 9. 1829 10. 1867 11. 1920                                                                                                                 |
|    |            |                                     | 12. 1959 13. 2000 14. 2400                                                                                                                        |
|    | 1 byte     | TX Carrier Frequency[1]             | 15. INVALID                                                                                                                                       |
| 13 | 1 byte     | RX Trellis Coding[1]                | 0. 16. 1. 32 2. 64                                                                                                                                |
|    | 1 byte     | TX Trellis Coding[1]                | 0. 16. 1. 32 2. 64                                                                                                                                |
| 14 | 1 byte     | RX Preemphasis Index[1]             | 0 through 10                                                                                                                                      |
|    | 1 byte     | TX Preemphasis Index[1]             | 0 through 10                                                                                                                                      |
| 15 | 1 byte     | RX Constellation Shaping[1]         | 0. Active 1. None                                                                                                                                 |
|    | 1 byte     | TX Constellation Shaping[1]         | 0. Active 1. None                                                                                                                                 |
| 16 | 1 byte     | RX Nonlinear Encoding[1]            | 0. Active 1. None                                                                                                                                 |
|    | 1 byte     | TX Nonlinear Encoding[1]            | 0. Active 1. None                                                                                                                                 |
| 17 | 1 byte     | RX Precoding[1]                     | 0. Active 1. None                                                                                                                                 |
|    | 1 byte     | TX Precoding[1]                     | 0. Active 1. None                                                                                                                                 |
| 18.| 1 byte     | RX Xmit Level Reduction[1]          | 0 to 15 in dBm of reduction                                                                                                                       |
|    | 1 byte     | TX Xmit Level Reduction[1]          | 0 to 15 in dBm of reduction                                                                                                                       |
| 19 | 1 word-16  | SNR[2]                              | 0 to 70 in dB steps                                                                                                                               |
| 20 | 1 word-16  | Receive Level[2]                    | 0 to 128 in dBm steps.                                                                                                                            |
| 21 | 1 word-16  | Frequency Offset[2]                 | +/−32 in 1Hz steps.                                                                                                                               |
| 22 | 1 word-16  | Phase Jitter Frequency[2]           | 0 to 64 in 1Hz steps.                                                                                                                             |
| 23 | 1 word-16  | Phase Jitter Level[2]               | 0 to ?? degrees.                                                                                                                                  |
| 24 | 1 word-16  | Far End Echo Level[2]               | 0 to −15 in dBm of far end echo level (that portion of the transmitted analog signal which has bounced off of the remote modem's analog front end). |
| 25 | 1 word-16  | Phase Roll[2]                       | +/−?? degrees.                                                                                                                                    |
| 26 | 1 word-16  | Round Trip Delay[2]                 | total round trip propagation delay of the link (in milliseconds).                                                                                 |
| 27 | 25 bytes   | Line Shape[1]                       | 25 data points                                                                                                                                    |
|    | 1 byte     | Fill for alignment                  | 0                                                                                                                                                 |

[1]This quantity is only valid in V.34 and V.34bis; for all other standards the result will be 0x8000.
[2]This array is only valid in V.32, V.32bis, V.32terbo, V.34 and V.34bis: for all other standards the result will be 0x8000.

What is claimed is:

1. A method of controlling an interface between a computer and a telephone line, comprising:
   providing an interface device between the telephone line and the computer;
   providing a set of commands readable by the interface device, said commands controlling operations performed by the interface device;
   dividing the commands into a plurality of categories, each category corresponding to a class of operations performed by the interface device and each command being included within a single category;
   selecting a command from a category of commands based on a desired operation to be performed by the interface device; and
   with the interface device, reading the selected command to initiate performance of the desired operation.

2. The method of claim 1 wherein the interface device is a modem.

3. The method of claim 1 wherein the interface device is an ISDN terminal adapter.

4. The method of claim 1 wherein one of the classes of operations performed by the interface device is altering its configuration to a desired operational mode.

5. The method of claim 1 wherein one of the classes of operations is reporting status of the interface device.

6. The method of claim 5 wherein the status of the interface device is reported without being requested.

7. The method of claim 1 wherein one of the classes of operations is a query class in which the interface device is prompted to return information.

8. The method of claim 1 wherein one of the classes of operations is commanding the interface device to perform specified tasks.

9. The method of claim 1 wherein the commands are divided into no more than four categories.

10. The method of claim 1 wherein at least one of the commands includes a parameter used to define the command.

11. The method of claim 1 wherein:
   A) each command includes an operation code having an integer value;
   B) the method further includes associating each of the categories with a different, non-overlapping range of integer values; and
   C) the operation code included in a command lies in the range of integer values associated with the category to which that command belongs.

12. The method of claim 11 wherein one of the classes of operations is reporting the status of the interface device.

13. The method of claim 11 wherein one of the classes of operations is a query class in which the interface device is prompted to return information.

14. The method of claim 11 wherein one of the classes of operations performed by the interface device is altering its configuration to a desired operational mode.

15. The method of claim 11 wherein one of the classes of operations is commanding the interface device to perform specified tasks.

16. An interface device for providing communication between a host computer and a telephone line comprising: a memory that stores a set of commands that are readable by the interface device, the set of commands being divided into a plurality of categories, each category corresponding to a class of operations performed by the interface device and each command being included within a single category; and a processor coupled to the memory and controllable to initiate performance of operations of the interface device in response to commands from the set of commands, the processor receiving a command selected from a category of commands based on a desired operation to be performed by the interface device and initiating performance of the desired operation in response to the selected command.

17. The interface device of claim 16 wherein the interface device comprises a modem.

18. The interface device of claim 16 wherein the interface device comprises an ISDN terminal adapter.

19. The interface device of claim 16 wherein one of the classes of operations performed by the interface device is altering its configuration to a desired operational mode.

20. The interface device of claim 16 wherein one of the classes of operations performed by the interface device is reporting status of the interface device.

21. The interface device of claim 20 wherein the status of the interface device is reported without being requested.

22. The interface device of claim 16 wherein one of the classes of operations performed by the interface device is a query class in which the interface device is prompted to return information.

23. The interface device of claim 16 wherein one of the classes of operations performed by the interface device is commanding the interface device to perform specified tasks.

24. The interface device of claim 16 wherein the commands are divided into no more than four categories.

25. The interface device of claim 16 wherein at least one of the commands includes a parameter used to define the command.

26. The interface device of claim 16 wherein:

A) each command includes an operation code having an integer value;

B) the interface device further associates each of the categories with a different, non-overlapping range of integer values; and C) the operation code included in a command lies in the range of integer values associated with the category to which that command belongs.

27. The interface device of claim 26 wherein one of the classes of operations is reporting the status of the interface device.

28. The interface device of claim 26 wherein one of the classes of operations is a query class in which the interface device is prompted to return information.

29. The interface device of claim 26 wherein one of the classes of operations performed by the interface device is altering its configuration to a desired operational mode.

30. The interface device of claim 26 wherein one of the classes of operations is commanding the interface device to perform specified tasks.

* * * * *